(12) United States Patent
Srivastava et al.

(10) Patent No.: US 10,986,605 B2
(45) Date of Patent: Apr. 20, 2021

(54) PROVIDING A NETWORK LOCATION SERVICE WHEN A USER EQUIPMENT IS NOT SERVED BY A THIRD GENERATION PARTNERSHIP PROJECT (3GPP) RADIO

(71) Applicant: Cisco Technology, Inc., San Jose, CA (US)

(72) Inventors: Vimal Srivastava, Bangalore (IN); Srinath Gundavelli, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/516,737

(22) Filed: Jul. 19, 2019

(65) Prior Publication Data

US 2021/0022103 A1 Jan. 21, 2021

(51) Int. Cl.
*H04W 4/029* (2018.01)
*H04W 64/00* (2009.01)
(Continued)

(52) U.S. Cl.
CPC ......... *H04W 64/003* (2013.01); *H04W 4/029* (2018.02); *H04W 4/40* (2018.02);
(Continued)

(58) Field of Classification Search
CPC ....... H04W 4/70; H04W 60/00; H04W 48/18; H04W 8/08; H04W 4/90; H04W 76/10;
(Continued)

(56) References Cited

U.S. PATENT DOCUMENTS 9,693,184 B2 6/2017 Edge et al.
2015/0327048 A1* 11/2015 Lee ................... H04W 8/005
370/329
(Continued)

FOREIGN PATENT DOCUMENTS

WO 2016159712 A1 10/2016
WO 2018128372 A1 7/2017
(Continued)

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 16)", 3GPP TS 23.401 V16.2.0, dated Mar. 2019 (Year: 2019).*
(Continued)

*Primary Examiner* — Daniel Lai
(74) *Attorney, Agent, or Firm* — Edell, Shapiro & Finnan, LLC

(57) ABSTRACT

Techniques are described to provide a network location service for a user equipment (UE) when the UE is not served by a 3GPP radio; thereby enabling radio resource selection by the UE for Autonomous PC5 based communications. In one example, a method includes receiving, by a mobility element of a network, an attach request from a UE, wherein the attach request indicates an attach type associated with a network location service. The method may further include communicating, based on the attach type being associated with the network location service, an attach accept to the UE to trigger a location request for the UE, wherein the attach accept is communicated to the UE without the mobility element authenticating the UE; and communicating location information to the UE based on the location request.

20 Claims, 7 Drawing Sheets

(51) Int. Cl.
*H04W 4/40* (2018.01)
*H04W 48/16* (2009.01)
*H04W 60/00* (2009.01)
*H04W 48/18* (2009.01)
*H04W 12/06* (2021.01)

(52) U.S. Cl.
CPC .......... *H04W 48/16* (2013.01); *H04W 48/18* (2013.01); *H04W 60/00* (2013.01); *H04W 12/06* (2013.01)

(58) Field of Classification Search
CPC ..... H04W 72/04; H04W 76/50; H04W 76/14; H04W 76/25; H04W 84/045; H04W 4/40; H04W 4/80; H04W 64/003; H04W 36/03; H04W 48/16; H04W 4/029; H04W 12/06; H04W 4/02; H04W 76/18; H04W 88/16; H04W 60/04; H04W 8/02; H04W 24/02; H04W 4/50; H04W 28/16; H04W 40/24; H04W 4/00; H04W 4/16; H04W 8/04; H04W 8/06; H04W 8/18; H04W 4/44; H04W 4/46; H04W 8/065; H04L 65/1069
See application file for complete search history.

(56) References Cited

U.S. PATENT DOCUMENTS

| | | | |
|---|---|---|---|
| 2016/0014586 | A1 | 1/2016 | Stupar et al. |
| 2017/0156043 | A1 | 6/2017 | Li et al. |
| 2018/0077668 | A1* | 3/2018 | Chun .................... H04W 8/005 |
| 2018/0109937 | A1* | 4/2018 | Lee .................. G08G 1/096775 |
| 2018/0167913 | A1* | 6/2018 | Ying ..................... H04W 76/10 |
| 2018/0227841 | A1* | 8/2018 | Shimojou ............. H04W 8/183 |
| 2018/0242385 | A1* | 8/2018 | Chandramouli ...... H04W 76/16 |
| 2018/0288588 | A1* | 10/2018 | Uchiyama ......... H04W 72/0406 |
| 2019/0045576 | A1 | 2/2019 | Jung et al. |
| 2019/0132717 | A1* | 5/2019 | Xu .......................... H04W 8/08 |
| 2019/0327618 | A1* | 10/2019 | Li ........................... H04W 4/46 |
| 2019/0357024 | A1* | 11/2019 | Baghel .................... H04W 4/40 |

FOREIGN PATENT DOCUMENTS

| | | |
|---|---|---|
| WO | 2017146534 A1 | 8/2017 |
| WO | 2018117774 A1 | 6/2018 |
| WO | 2018117775 A1 | 6/2018 |

OTHER PUBLICATIONS

"Cellular V2X Technology Overview" by Qualcomm, dated 2019 (Year: 2019).*
"MME Administration Guide, StarOS" by Cisco, Release 21.6, dated Jan. 25, 2018 (Year: 2018).*
3GPP Organizational Partners, "3rd Generation Partnership Project; Technical Specification Group Services and System Aspects; Architecture enhancements for 5G System (5GS) to support Vehicle-to-Everything (V2X) services (Release 16)", 3GPP TS 23.287 V0.3.0, Apr. 2019, 40 pages.
3GPP Organizational Partners, "3rd Generation Partnership Project; Technical Specification Group Core Network and Terminals; Non-Access-Stratum (NAS) functions related to Mobile Station (MS) in idle mode (Release 8)", 3GPP TS 23.122 V8.2.0, Jun. 2008, 35 pages.
3GPP Organizational Partners, "3rd Generation Partnership Project; Technical Specification Group Services and System Aspects; Functional stage 2 description of Location Services (LCS) (Release 15)", 3GPP TS 23.271 V15.1.0, Sep. 2018, 184 pages.
3GPP Organizational Partners, "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 15)", 3GPP TS 36.305 V15.10, Mar. 2019, 91 pages.
3GPP Organizational Partners, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.5.1, Apr. 2019, 948 pages.
Athul Prasad et al., "Energy Efficient D2D Discovery for Proximity Services in 3GPP LTE-Advanced Networks", downloaded Jul. 16, 2019, 8 pages.
Electronics Notes, "LTE Channels: Physical, Logical and Transport", https://www.electronics-notes.com/articles/connectivity/4g-lte-long-term-evolution/physical-logical-transport-data-channels.php, downloaded Jul. 16, 2019, 10 pages.
ETSI, "LTE; Evolved Universal Terrestrial Radio Access (E-UTRA); Radio Resource Control (RRC); Protocol specification (3GPP TS 36.331 version 10.1.0 Release 10)", ETSI TS 136 331 V10.1.0, Apr. 2011, 292 pages.
Wikipedia, "Vehicle-to-everything", Apr. 17, 2019, 10 pages.
3GPP Organizational Partners, "3rd Generation Partnership Project; Technical Specification Group Services and System Aspects; Architecture enhancements for 5G System (5GS) to support Vehicle-to-Everything (V2X) services (Release 16)", 3GPP TS 23.287 V1.0.0, May 2019, 47 pages.
ETSI, "Universal Mobile Telecommunications System (UMTS); LTE; Architecture enhancements for V2X services (3GPP TS 23.285 version 14.2.0 Release 14)", ETSI TS 123 285 V14.2.0, May 2017, 37 pages.
International Search Report and Written Opinion in counterpart International Application No. PCT/US2020/041766, dated Sep. 11, 2020, 16 pages.
3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 16)", 3GPP TS 23.401 V16.3.0, Jun. 2019, 423 pages.

* cited by examiner

PROVIDING A NETWORK LOCATION SERVICE WHEN A USER EQUIPMENT IS NOT SERVED BY A THIRD GENERATION PARTNERSHIP PROJECT (3GPP) RADIO

TECHNICAL FIELD

The present disclosure relates to telecommunications technology.

BACKGROUND

Cellular vehicle-to-everything (C-V2X) allows methods for communications utilizing the 'Uu' interface, also referred to as the Uu reference point, and PC5 communications using the PC5 interface, also referred to as the PC5 reference point. For Long Term Evolution Uu (LTE-Uu) based communications, a vehicle-to-everything (V2X) enabled user equipment (V2X-UE) establishes a packet data network (PDN) connection with a core network and sends packets to the core network. The core network then broadcasts or unicast the packets to intended V2X-UEs. For PC5 based communications, a V2X-UE can broadcast packets directly to other V2X-UEs via the PC5 interface. However, there are challenges in facilitating PC5 based communications when a UE is not served by a cellular radio.

DESCRIPTION OF EXAMPLE EMBODIMENTS

Overview

Figure 1:
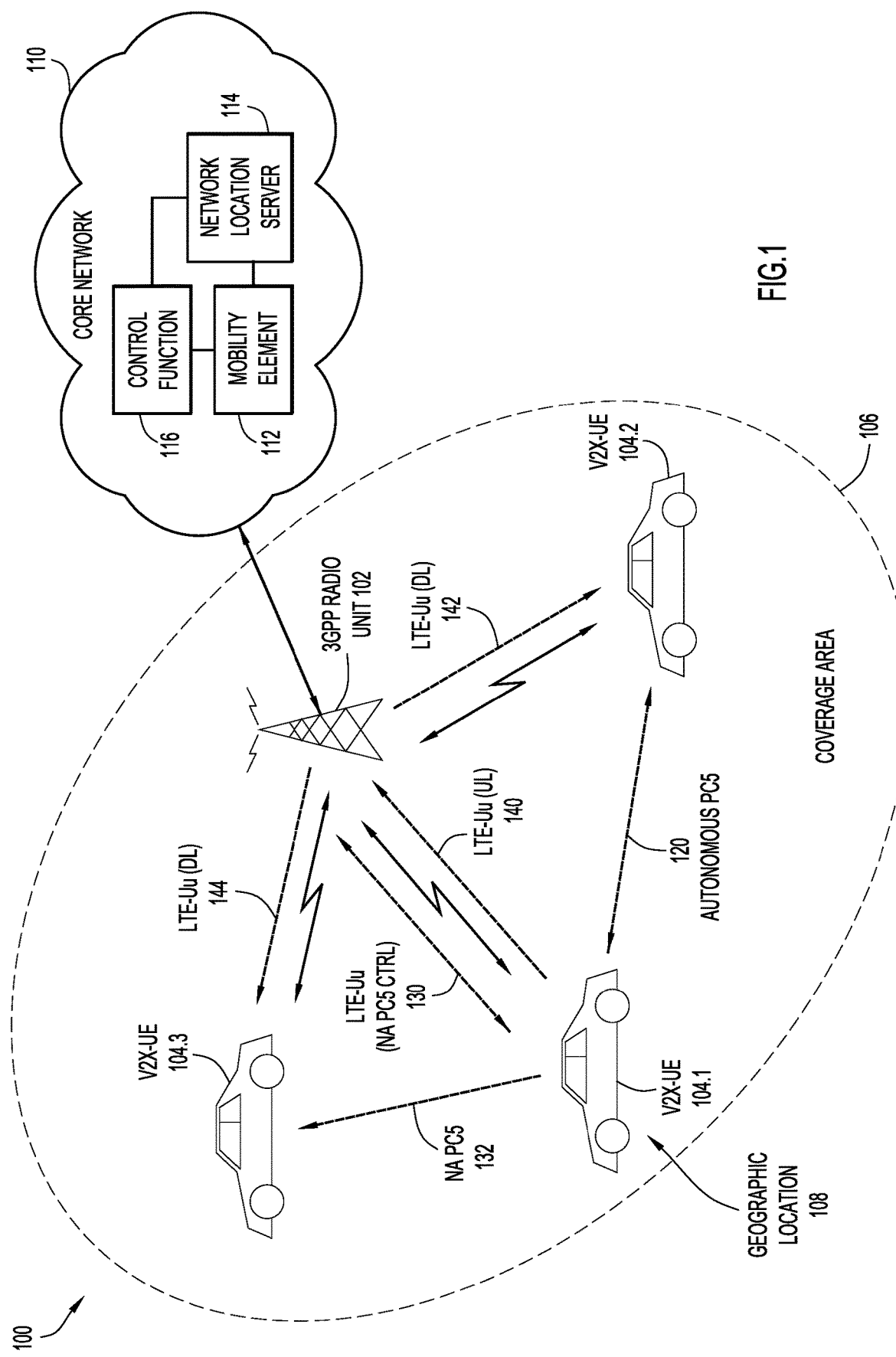
FIG. 1 is a block diagram of a system in which techniques for providing a network location service when a user equipment (UE) is not served by a 3GPP radio may be implemented, according to an example embodiment.

While Third (3rd) Generation Partnership Project (3GPP) cellular vehicle-to-everything (C-V2X) standards offer an LTE-Uu mode of communication and a network assisted PC5 based mode of communication, the Autonomous PC5 based mode communication is the preferred choice for communications among C-V2X enabled user equipment (V2X-UEs) due to the very low latency involved in such communications. For example, LTE-Uu based C-V2X communications may not be sufficient for all use cases and network assisted PC5 communications may not be available all the time and, moreover, also have dependencies on the core network and, hence, increased latency. For supporting Autonomous PC5 communications, it is important that a V2X-UE is aware of its geographic location. Presented herein are techniques to provide a network location service for a V2X-UE when the V2X-UE is not served by a 3GPP radio; thereby enabling radio resource selection by the V2X-UE to perform Autonomous PC5 communications with one or more other V2X-UE(s).

In an example embodiment, a method is provided that includes obtaining, by a mobility element of a network, an attach request from a user equipment (UE), wherein the attach request indicates an attach type associated with a network location service; communicating, based on the attach type being associated with the network location service, an attach accept to the UE to trigger a location request for the UE, wherein the attach accept is communicated to the UE without the mobility element authenticating the UE; and communicating location information to the UE based on the location request

Example Embodiments

The following foundational information may be viewed as a basis from which the present disclosure may be properly explained. Communications in a network environment can be referred to herein as 'messages', 'messaging', 'signaling', 'data', 'content', 'objects', 'requests', 'queries', 'responses', 'replies', etc. which may be inclusive of packets. Additionally, messages, requests, responses, replies, queries, etc. are forms of network traffic and, therefore, may comprise one or more packets. As referred to herein and in the claims, the term 'packet' may be used in a generic sense to include packets, frames, segments, datagrams, and/or other generic data units that may be used to transmit communications (e.g., data, commands, etc.) in a network environment. A packet is a formatted unit of data that can contain control or routing information (e.g., source and destination address, source and destination port, etc.) and data, which is also sometimes referred to as a payload or data payload. In some embodiments, control or routing information, management information, or the like can be included in packet fields, such as within header(s) and/or trailer(s) of packets.

The terms 'data', 'information', 'parameters,' and the like as used herein can refer to any type of binary, numeric, voice, video, textual or script data or information or any type of source or object code, or any other suitable data or information in any appropriate format that can be communicated from one point to another via electronic devices and/or networks.

In C-V2X, there are two modes specified in Third Generation Partnership Project (3GPP) standards for PC5 based communications including: A) Network Assisted (NA) mode when a UE (e.g., V2X UE) is served by an Evolved Universal Mobile Telecommunications System (UMTS) Terrestrial Radio Access (E-UTRA) air interface or is served by a New Radio (NR) air interface; and B) Autonomous mode when a UE is not served by the E-UTRA or NR air interface. In general, a V2X-UE may be any UE for which one or more V2X applications are configured and/or provisioned thereon. PC5 communications are sometimes referred to as side link (SL) communications.

Radio parameters or resources, such as the carrier frequency or a preconfigured channel to utilize for Autonomous PC5 based communications for a given geographic location or area, can be preconfigured for a UE via any combination of a V2X Control Function (V2X-CF), V2X Application Server (V2X-AS), and/or Policy Control Function (PCF)

and/or can be configured for the UE in the Mobile Equipment (ME) itself and/or in the Universal Integrated Circuit Card (UICC) of the UE.

A UE may be consider itself not served by E-UTRA or NR air interface or, more generally, not served by a 3GPP radio, when the UE is unable to latch onto a radio/cell. There may be many reasons why a UE may not be able to latch onto a radio/cell, such as due to a Radio Access Technology (RAT) type restriction for the UE, if the UE is unable to find a Public Land Mobile Network (PLMN) to latch on, among others. A UE that may not be able to latch onto a radio/cell may still be capable of communications (receiving and/or transmitting) with radio unit(s) of an access network and also with a core network.

When a UE is not served by an E-UTRA/NR, the UE uses the preconfigured radio resources (e.g., provisioned in the ME and/or the UICC) for Autonomous PC5 communications. Currently 3GPP Technical Specification (TS) 23.287, Release 16, Version 1.0.0, published Jun. 3, 2019, Section 5.1.2.1 defines a condition for Autonomous PC5 mode communications as follows:

"The UE uses the radio parameters to perform V2X communications over PC5 reference point when "not served by E-UTRA" and "not served by NR" only if the UE can reliably locate itself in the corresponding Geographical Area. Otherwise, the UE is not authorized to transmit."

As noted previously, Network Assisted (NA) PC5 communication involves some delay because a UE is to request resources from the network every time it intends to send a packet on the PC5 interface. This makes the Autonomous PC5 mode of communication a preferred mode for low latency use cases. However, Autonomous PC5 based communications involves a UE reliably knowing its geographical location in order to select radio resources to perform PC5 transmissions.

While current C-V2X 3GPP specifications specify support for the V2X service when a UE is not served by an E-UTRA/NR, current 3GPP specifications do not specify how a UE would use PC5 based communications when the UE is unable to determine/locate its current geographical location.

Presented herein are techniques that provide that a V2X-UE, while not served by an E-UTRA or NR (e.g., not served by a 3GPP radio), can reliably find its geographic location and therefore identify the correct/appropriate radio resources configured for Autonomous PC5 based communication for a given geographic location to enable the V2X-UE to perform Autonomous PC5 communications with one or more other V2X-UE(s) for the given geographic location. In one embodiment, techniques herein provide a network location service to provide location information to a V2X-UE regarding the current geographic location of the V2X-UE (or an estimate thereof) when the V2X-UE is not served by an E-UTRA or NR to enable radio resource selection by the V2X-UE to perform Autonomous PC5 based communications.

Although embodiments discussed herein are described with reference to C-V2X architectures, it is to be understood that techniques for providing a network location service for a UE may be applied to other architectures as well including, but not limited to Third Generation Partnership Project (3GPP) Device-to-Device (D2D) architectures, private Long Term Evolution (LTE) architectures (e.g., for enterprise environments), Citizen Broadband Radio Service (CBRS) architectures, combinations thereof, and/or the like.

FIG. 1 is a block diagram of a system 100 in which techniques for providing a network location service when a user equipment (UE) is not served by a 3GPP radio (e.g., not served by an E-UTRA or NR) may be implemented, according to an example embodiment. In at least one implementation, the system 100 may include a 3GPP radio unit 102 and a core network 110. Core network 110 may include a mobility element 112, a network location server 114, and a control function (CF) 116. Also illustrated in system 100 are a number of V2X UEs 104.1-104.3. It is to be understood that any number of V2X UEs may be present in system 100.

In general, interfaces among one or more network elements, functions, services, etc. of system 100 may include wired and/or wireless interfaces. For system 100, 3GPP radio unit 102 may interface with any of mobility element 112, network location server 114, and control function 116 of core network 110 to perform various operations as described herein. Additionally, mobility element 112, network location server 114, and control function 116 of core network 110 may interface with each other to perform various operations as described herein.

The 3GPP radio unit 102 may include one or more antenna assemblies as well as transmitter and receiver hardware (sometimes referred to as a 'radio head') and/or software to facilitate RF communications with V2X UEs 104.1-104.3, which may each also include such antenna assemblies and transmitter/receiver hardware and/or software to perform operations as described herein. In general, 3GPP radio unit 102 may facilitate 3GPP cellular communications for one or more radio access technology (RAT) types, including any combination of Third (3rd) Generation (3G), Fourth (4th) Generation/LTE/LTE-Advanced (4G/LTE/LTE-A), Fifth (5th) Generation (5G), and/or New Radio (NR) communications for a coverage area 106 within system 100.

In various embodiments, 3GPP radio unit 102 may be any combination of a NodeB (e.g., for 3G architectures), an evolved Node B (eNodeB) (e.g., for 4G/LTE architectures), a gNodeB (e.g., for 5G architectures) and/or a NR radio unit (e.g., for any next generation 3GPP architectures). In some implementations, 3GPP radio unit 102 may form a whole or part of one or more Radio Access Networks (RANs) (e.g., an Evolved Universal Mobile Telecommunications System (UMTS) Terrestrial RAN (E-UTRAN) for 4G/LTE RANs, 5G RANs, etc.). In some embodiments, 3GPP radio unit 102 may be any combination of a distributed unit (DU) and/or centralized unit (CU) for a disaggregated RAN architecture. It is to be understood that any number of 3GPP radio units 102 may be present within system 100 in accordance with various embodiments.

In general, core network 110 may be associated with any combination of 3GPP core networks such as, for example, an Evolved Packet Core (EPC) (e.g., for 4G/LTE architectures), a 5G Core network (5GC), and/or any next generation 3GPP core network(s). Mobility element 112, network location server 114, and control function 116 are illustrated within core network 110 for purposes of illustrating various features to facilitate a network location service for one or more V2X-UEs; however, it is to be understood that core network 110 may include any other elements, functions, services, repositories, etc. and may facilitate operations, communications, etc. that may or may not conform to one or more standards such as 3GPP standards, European Telecommunications Standards Institute (ETSI) standards, Internet Engineering Task Force (IETF), Institute of Electrical and Electronics Engineers (IEEE) standards, and/or the like.

Among other operations as described herein, mobility element 112 may, in general, provide mobility management control for one or more UEs (e.g., V2X-UEs 104.1-104.3).

For instances other than when mobility element 112 facilitates the network location service, as discussed for embodiments herein, mobility element 112 may provide access authentication and authorization services for one or more UEs. In various embodiments, mobility element 112 may be implemented as any combination of a mobility management element (MME) (e.g., for 4G LTE architectures, including 4G control and user plane separation (4G CUPS) architectures) and/or an access and mobility management function (AMF) (e.g., for 5G and/or New Radio (NR) architectures, including non-standalone (NSA) and standalone (SA) architectures).

Among other operations as described herein, network location server 114 may provide geographic location information for a given V2X-UE regarding a current geographic location for the V2X-UE via a Mobile Originated Location Request (MO-LR) exchange with the V2X-UE. In general, MO-LR procedures are prescribed by 3GPP TS 23.271. In various embodiments, geographic location information (sometimes referred to as 'position information') may include any combination of geographical coordinates (e.g., latitude and longitude) and/or estimates thereof, velocity information, assistance information (e.g., measurement information/data, positioning method information/data, cell information/data, etc.) that may assist a UE in determining its location and/or estimated location using one or more positioning methods (e.g., that may be configured for the UE and/or for one or more applications for the UE), combinations thereof, and/or the like. Thus, in some embodiments, network location server 114 may provide a geographic location and/or estimated geographic location to a given V2X-UE; yet, in other embodiments, network location server 114 may provide information (e.g., assistance information, etc.) to a given V2X-UE to enable the V2X-UE to determine its geographic location. In various embodiments, network location server 114 may be implemented as any combination of an Evolved-Serving Mobile Location Center (E-SMLC), any other type of SMLC, and/or variations thereof, as may be prescribed by 3GPP standards.

Among other operations as described herein, CF 116 may provide configuration services for configuring C-V2X radio resources for V2X-UEs 104.1-104.3 to enable Autonomous PC5 communications for V2X-UEs 104.1-104.3 for different geographic areas within system 100. For example, CF 116 may configure, for each of a plurality of geographic areas within system 100, radio resources, such as a carrier frequency or preconfigured channel that may be used for Autonomous PC5 communications for each geographic area. During operation, for a given geographic location that is within one of the configured geographical areas, a given V2X-UE may select appropriate radio resources (e.g., an appropriate carrier frequency or channel) for PC5 communications for the given geographic location. In various embodiments, CF 116 may be implemented as any combination of a V2X-CF, a V2X-AS, a Policy and Charging Rule Function (PCRF), a PCF, and/or the like.

In various embodiments, V2X-UEs 104.1-104.3 may be associated with any user, subscriber, employee, client, customer, electronic device, etc. wishing to initiate a flow in system 100. The terms 'C-V2X UE', 'V2X-UE', 'UE device', 'UE', 'subscriber', 'UE/subscriber', 'mobile device', 'user', and variations thereof are inclusive of V2X-UEs having one or more V2X applications configured and/or provisioned thereon, which are used to initiate a communication, such as a computer, a vehicle, train, boat, airplane, drone, and/or any other transportation related device having electronic devices configured thereon, an electronic device such as a parking meter, vending machine, industrial device, automation device, enterprise device, appliance, Internet of Things (IoT) device, etc., a personal digital assistant (PDA), a laptop or electronic notebook, a cellular telephone, an iPhone™, iPad™, a Google Droid™ phone, an IP phone, wearable electronic device or any other device, component, element, or object capable of initiating voice, audio, video, media, or data exchanges within system 100. V2X-UEs discussed herein may also be inclusive of a suitable interface to a human user such as a microphone, a display, a keyboard, or other terminal equipment. V2X-UEs discussed herein may also be any device that seeks to initiate a communication on behalf of another entity or element such as a program, a database, or any other component, device, element, or object capable of initiating an exchange within system 100. It is to be understood that any number of V2X-UEs may be present in system 100.

Respective V2X-UEs 104.1-104.3 may interface with 3GPP radio unit 102 via respective over-the-air radio frequency (RF) communications utilizing respective 3GPP LTE-Uu interfaces. In some instances, respective V2X-UEs 104.1-104.3 may perform over-the-air RF communications with each other utilizing respective 3GPP PC5 interfaces.

Consider one operational example involving LTE-Uu communications from V2X-UE 104.1 to each of V2X-UE 104.2 and V2X-UE 104.3. For this example, consider that V2X-UE 104.1 transmits an LTE-Uu uplink (UL) communication 140 (e.g., a data packet) to 3GPP radio unit 102. In turn, 3GPP radio unit 102 transmits an LTE-Uu downlink (DL) communication 142 (e.g., the data packet) to V2X-UE 104.2 and another LTE-Uu DL communication 144 to V2X-UE 104.3.

Consider another operational example involving a Network Assisted (NA) PC5 communication 132 from V2X-UE 104.1 to V2X-UE 104.3. For this example, consider that V2X-UE 104.1 first performs LTE-Uu communications 130 with 3GPP radio unit 102 (e.g., one or more requests/responses) to determine NA PC5 control information (e.g., radio resources, etc.), which V2X-UE 104.1 utilizes to perform the NA PC5 communication 132 towards V2X-UE 104.3.

Consider another operational example involving Autonomous PC5 communications 120 for a data exchange (transmission and/or reception) between V2X-UE 104.1 and V2X-UE 104.2 while V2X-UE 104.1 is not served by 3GPP radio unit 102 (e.g., is not served by an E-UTRA or NR). The example involving the Autonomous PC5 communications 120 between V2X-UE 104.1 and V2X-UE 104.2 is discussed with reference to FIGS. 2A and 2B, which are a message sequence diagram illustrating a call flow 200 for providing the network location service when V2X-UE 104.1 is not served by 3GPP radio unit 102 (e.g., is not served by an E-UTRA or NR) within system 100.

As noted above, when a V2X-UE does not find a suitable radio/cell to latch on, it is considered out of coverage/not served by a 3GPP radio; however, if it can correctly identify its geographic location it can find the radio resources from the configuration for the geographic location. For the present example, V2X-UE 104.1 may determine its current geographic location via the network location service provided via core network 110 (e.g., via mobility element 112 and network location server 116).

For the present example, consider that V2X-UE 104.1 is configured at 202 with radio resources for different geographical areas within system 100, which includes a current geographical location for V2X-UE 104.1, shown in FIG. 1 as geographic location 108. In various embodiments, the configuration at 202 can be done in the equipment, UICC, and/or it can be done via CF 116 during authorization and provisioning when V2X-UE 104.1 is connected to the core network 110.

During operation, as shown at 204, 3GPP radio unit 102 typically broadcasts a Master Information Block (MIB) and a number of System Information Blocks (SIBs), including a first SIB (SIB1). For embodiments described herein, 3GPP radio unit 102 may advertise that core network 110 supports a network location service by including a parameter 'network-location-support' within a SIB1 broadcast that is received by V2X-UE 104.1.

Consider, at 206, that V2X-UE 104.1 goes out of E-UTRAN or NR coverage (e.g., is not served by 3GPP radio unit 102). At 208, 3GPP radio unit 102 performs a Broadcast Control Channel-Broad Channel-SIB1 (BCCH-BCH-SIB1) broadcast that includes the 'network-location-support' parameter. At 210, V2X-UE 104.1 scans the SIB1 block and determines based on the 'network-location-support' parameter that core network 110 supports the network location service.

In some embodiments, the inclusion of the 'network-location-support' parameter within SIB1 may be an indication that a given network supports a network location service. In some embodiments, a flag or other indication may be set for a 'network-location-support' parameter included in a SIB1, which may provide an indication that support for a network location service is enabled for a given network. Other variations can be envisioned.

Based on determining that core network 110 supports the location service, V2X-UE 104.1 sends an attach request message to the mobility element 112 (via 3GPP radio unit 102), at 212, in which the attach request includes an indication that indicates a 'network-location-support' attach type. In at least one embodiment, V2X-UE 104.1 (and any other V2X-UEs within system 100), may be configured to facilitate a 'network-location-support' attach type in order to indicate that mobility element 112 is to trigger location procedures to provide location information to V2X-UE 104.1. In various embodiments, configuring the 'network-location-support' attach type for a V2X-UE (e.g., V2X-UEs 104.1-104.3) may include configuring any combination of parameter(s), flag(s), and/or any other information that may be used to indicate the attach type in an attach request.

Upon receiving the attach request message, mobility element 112 determines, at 214, based on the 'network-location-support' attach type that it is to respond to V2X-UE 104.1 with an attach accept message, as shown at 216, without performing any authentication or authorization for V2X-UE 104.1. Further, mobility element 112 determines based on the 'network-location-support' attach type that it is to initialize and start a timer, which is to run for a short duration. After the short duration for the timer expires, as discussed at 238 below, the attach request for V2X-UE 104.1 may be considered expired and mobility element 112 may drop or otherwise remove context information for V2X-UE 104.1 associated with the attach request received from V2X-UE 104.1. In various embodiments, the short duration may range between 60 seconds and 120 seconds, however, this value may be tuned to be of a larger or a smaller value for various operating environments, conditions, etc.

In various embodiments, the duration of the timer may be configured by a network operator, a service provider, an application provider (e.g., the duration may be different for different V2X applications), combinations thereof, and/or the like.

Figure 2A:
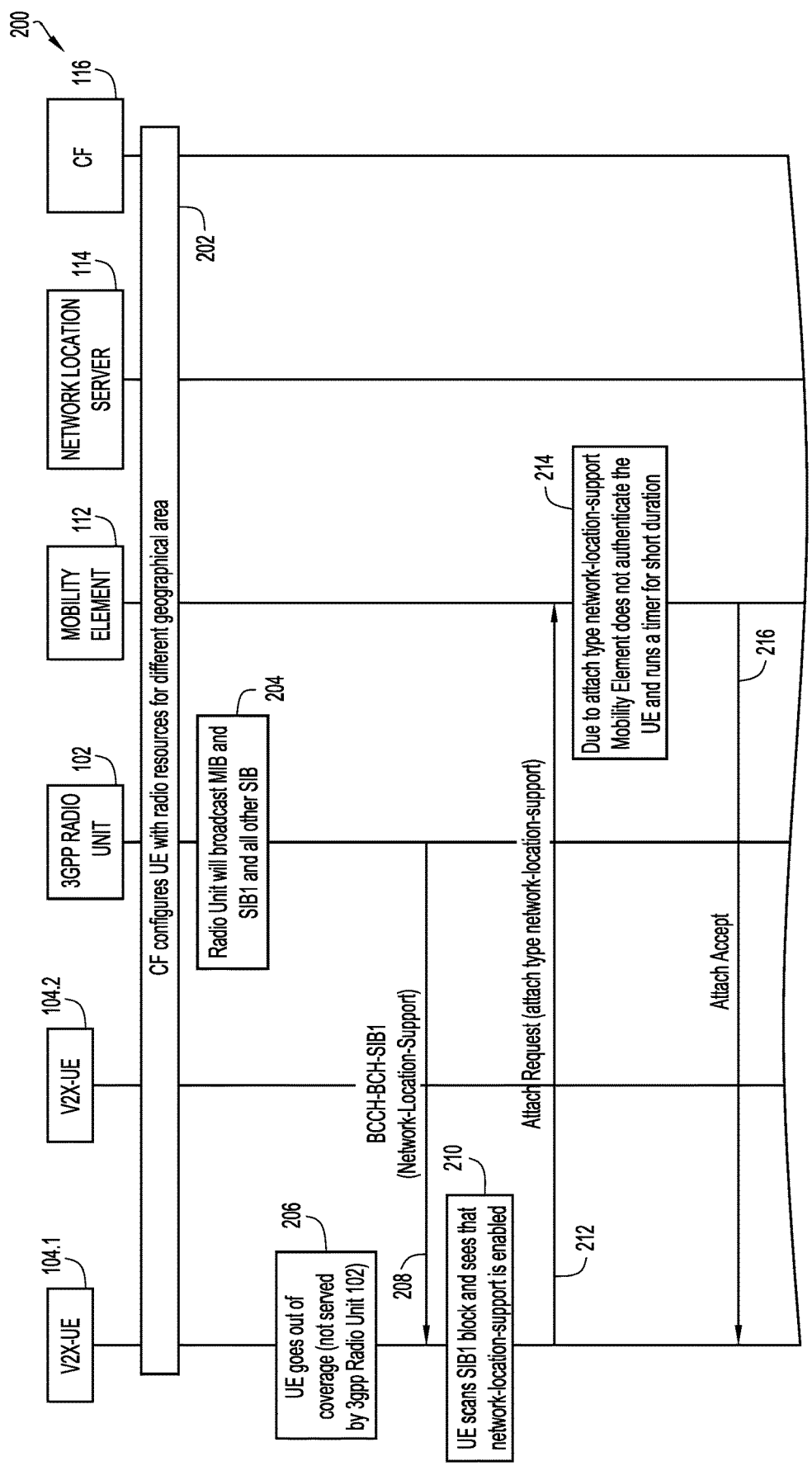
FIGS. 2A and 2B are a message sequence diagram illustrating a call flow for providing a network location service when a UE is not served by a 3GPP radio for the system of FIG. 1, according to an example embodiment.
Figure 2B:
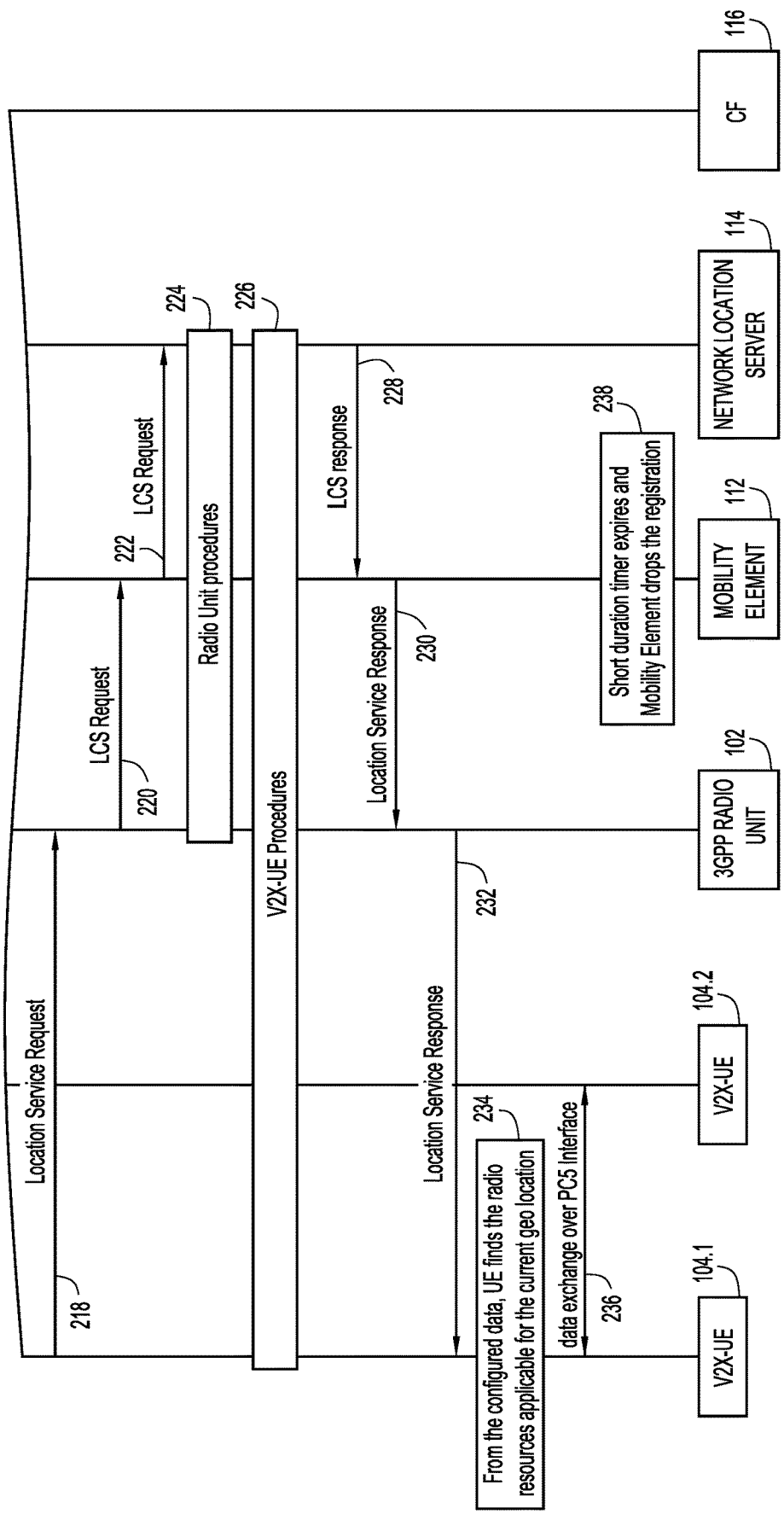

At 216, mobility element 112 responds to the attach request by communicating an attach accept message to V2X-UE 104.1. Upon reception of the attach accept message, V2X-UE 104.1 triggers, at 218, a Mobile Originated Location Request (MO-LR) procedure to determine its geographic location. Thus, as shown in FIG. 2A, mobility element 112 triggers location procedures for V2X-UE 104.1 based on the attach type 'network-location-support' received at 212.

The MO-LR procedure triggered for V2X-UE 104.1 is a standards based procedure, as prescribed by 3GPP TS 23.271. For the MO-LR procedure, V2X-UE 104.1 sends a Location Service (LCS) Request message to 3GPP radio unit 102 at 218, which forwards the LCS Request to mobility element 112 at 220. At 222, mobility element 112 forwards the LCS Request to network location server 114 to trigger network Location Service (LCS) procedures to be invoked for the network location server 114, which can include one or more 3GPP radio unit procedures, as shown at 224, and/or V2X-UE procedures, as shown at 226, as may be prescribed by 3GPP TS 23.271. Following the network location service procedures, network location server 114 communicates an LCS Response message to mobility element 112 at 228 to notify V2X-UE 104.1 about its current geographic location. In various embodiments, the notification can include location information for V2X-UE 104.1 (e.g., the geographical location 108 (or an estimate thereof) and/or information for V2X-UE 104.1 to determine geographical location 108 (or an estimate thereof)). The LCS Response message is forwarded to 3GPP radio unit 102 from mobility element 112, as shown at 230, and is forwarded from 3GPP radio unit 102 to V2X-UE 104.1, as shown at 232.

Based on the location information, at 234, V2X-UE 104.1 determines its current (or estimated) geographical location 108 and, from the radio resource data configured at 202, V2X-UE 104.1 determines the corresponding radio resources (e.g., carrier frequency or channel) applicable for the current geographical location 108 that are to be used for Autonomous PC5 based communications. Utilizing the determined radio resources, data is exchanged (transmitted and/or received), at 236, between V2X-UE 104.1 and V2X-UE 104.2 over the PC5 interface via Autonomous PC5 communications 120, as shown in FIG. 1. As shown at 238, following expiration (timeout) of the mobility element 112 timer, mobility element drops the attach context/registration information for V2X-UE 104.1.

Accordingly, system 100, including core network 110, provides a network location service to a V2X-UE (e.g., V2X-UE 104.1) for facilitating Autonomous PC5 based communications while the V2X-UE is not served by 3GPP radio unit 102. Support for the network location service can be advertised via a 'network-location-support' parameter included in a SIB1 block that is broadcast by 3GPP radio unit 102 and identified by the V2X-UE that receives the broadcast. Further, mobility element 112 does not perform authentication and also does not perform authorization for a V2X-UE seeking the network location service. Rather, the mobility element 112 triggers location procedures for the V2X-UE based on receiving an attach request from the V2X-UE of an attach type associated with the network location service (e.g., an attach of a type 'network-location-support'). Additionally, the mobility element initializes and runs a short duration timer to drop the V2X-UE context/registration information after the network location service is completed.

Figure 3:
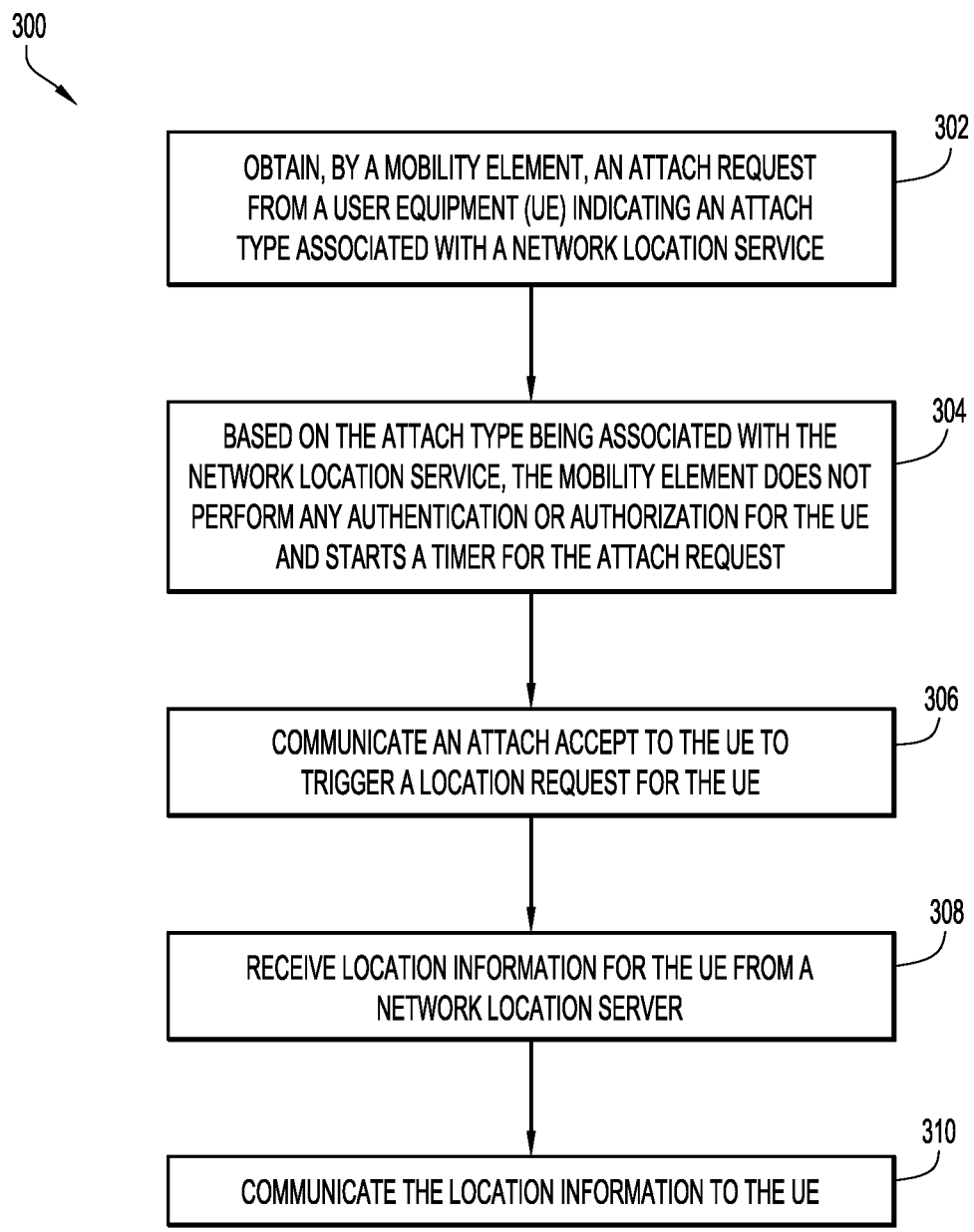
FIG. 3 is a flow chart depicting a method according to an example embodiment.

Referring to FIG. 3, FIG. 3 is a flow chart depicting a method 300 for providing a network location service for a UE (e.g., a V2X-UE) that is not served by a 3GPP radio (e.g., not served by an E-UTRA or NR) according to an example embodiment. In at least one embodiment, method 300 may be performed by a mobility element of a core network (e.g., mobility element 112 of core network 110).

At 302, the mobility element obtains an attach request message from a UE (e.g., V2X-UE 104.1 communicated via 3GPP radio 102) in which the attach request indicates an attach type associated with a network location service. For example, the mobility element may obtain an attach request that includes an indication that indicates a 'network-location-support' attach type. At 304, based on the attach type being associated with the network location service, the mobility element does not perform any authentication or authorization operations for the UE and starts a timer for the attach request. At 306, the mobility element communicates, based on the attach type being associated with the network location service, an attach accept message to the UE to trigger a location request for the UE. At 308, the mobility element receives location information for the UE from a network location server and, at 310, the mobility element communicates the location information to the UE. Communicating the location information to the UE enables to the UE to determine its current geographic location in order to enable Autonomous PC5 communications between the UE and one or more other UE.

Figure 4:
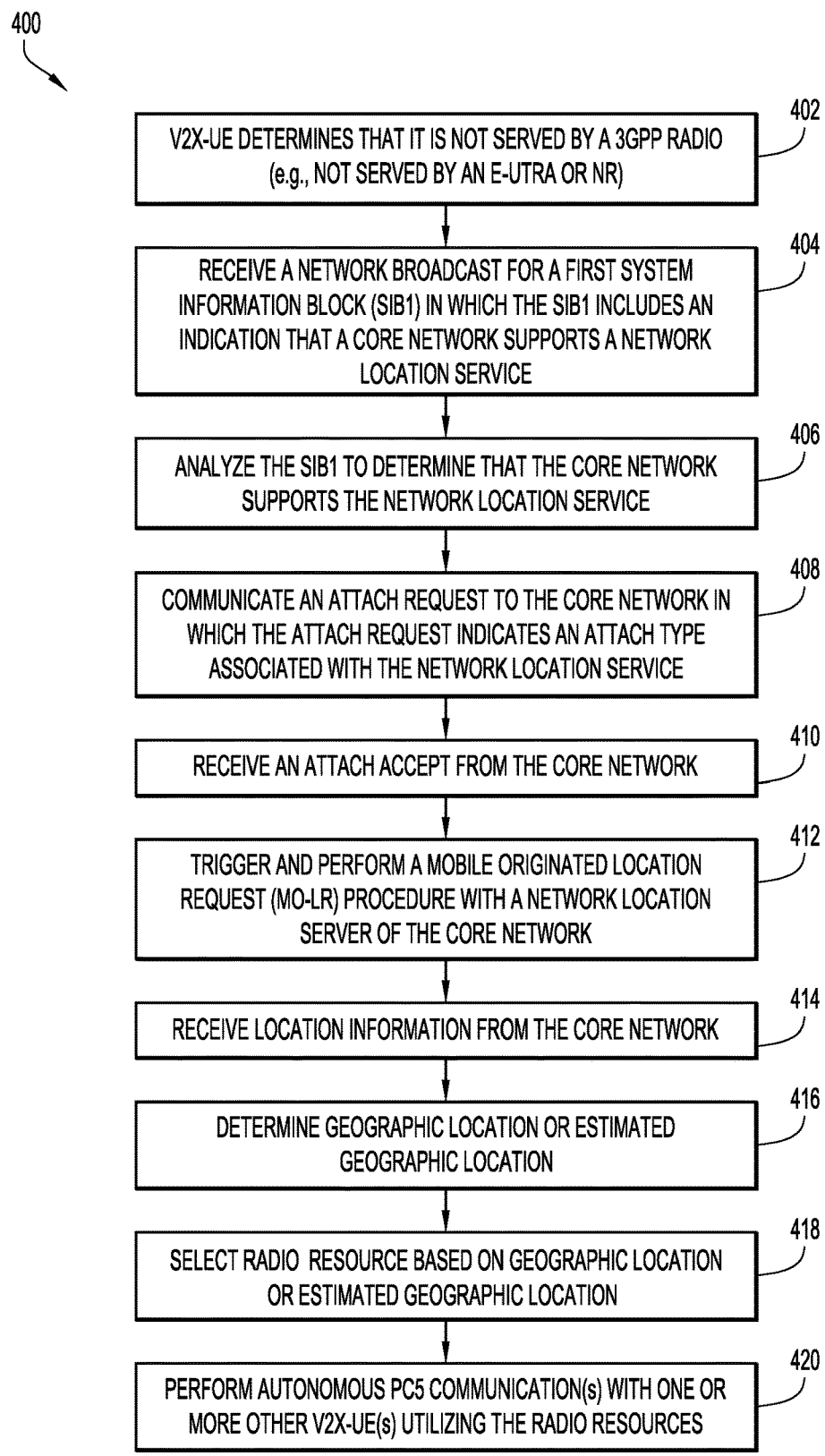
FIG. 4 is another flow chart depicting another method according to an example embodiment.

Referring to FIG. 4, FIG. 4 is a flow chart depicting a method 400 for providing Autonomous PC5 communications for a V2X-UE while the V2X-UE is not served by a 3GPP radio (e.g., not served by an E-UTRA or NR), according to an example embodiment. In at least one embodiment, method 400 may be performed by a V2X-UE (e.g., V2X-UE 104.1).

For method 400, it is assumed that the V2X-UE is configured with radio resource information (e.g., carrier frequency and/or channel information) for a plurality of geographical areas and desires to perform Autonomous PC5 communications with one or more other V2X-UE. In at least one embodiment, the geographical areas may be associated with one or more RANs (e.g., 4G and/or 5G RANs). In various embodiments, the configuration can provided in the equipment and/or UICC and/or it can be done via a control function/service/etc. during authorization and provisioning when the V2X-UE is connected to a core network (e.g., core network 110).

At 402, the V2X-UE determines that it is not served by a 3GPP radio (e.g., not served by an E-UTRA or NR). At 404, the V2X-UE receives a network broadcast for a first System Information Block (SIB1) in which the SIB1 contains an indication that a core network supports a network location service. In at least one embodiment, the indication may be a 'network-location-network' parameter included in the SIB1 that is broadcast. In at least one embodiment, the network broadcast may be performed by a 3GPP radio unit associated with the core network (e.g., 3GPP radio unit 102 associated with core network 110). Although 404 is illustrated as following the V2X-UE determination at 402, it is to be understood that the network broadcast may also be received by the V2X-UE prior to the V2X-UE determination at 402.

At 406, the V2X-UE analyzes the SIB1 to determine that the core network supports the network location service (e.g., the 'network-location-support' parameter is included or enabled in the SIB1). At 408, based on determining that the core network supports the network location service, the V2X-UE communicates an attach request message to the core network in which the attach request indicates an attach type associated with the network location service. For example, the attach request sent by the V2X-UE may include an indication that indicates a 'network-location-support' attach type.

At 410, the V2X-UE receives an attach accept message from the core network. At 412, based on receiving the attach accept, the V2X-UE triggers and performs an MO-LR procedure with a network location server of the core network. At 414, the V2X-UE receives location information from the core network. At 416, the V2X-UE determines its geographic location or its estimated geographic location based on the location information received from the core network.

At 418, the V2X-UE selects a radio resource based on the determined geographic location or estimated geographic location. At 420, the V2X-UE performs Autonomous PC5 communication(s) with one or more other V2X-UE(s) utilizing the selected radio resource.

In summary, techniques are provided herein in which a core network (e.g., core network 110) provides a network location service to a UE (e.g., V2X-UE 104.1) for facilitating Autonomous PC5 based communications while the UE is not served by a 3GPP radio (e.g., not served by an E-UTRA or NR). Support for the network location service can be advertised via a 'network-location-support' parameter included in a SIB1 block that is broadcast by a 3GPP radio unit (e.g., 3GPP radio unit 102) and identified by UE that receive the broadcast. Further, a mobility element (e.g., mobility element 112) does not perform authentication and also does not perform authorization for a UE seeking the network location service. Rather, the mobility element triggers location procedures for the UE based on receiving an attach request from the UE of an attach type associated with the network location service (e.g., an attach of a type 'network-location-support'). Additionally, the mobility element initializes and runs a short duration timer to drop the UE context/registration information after the network location service is completed.

Figure 5:
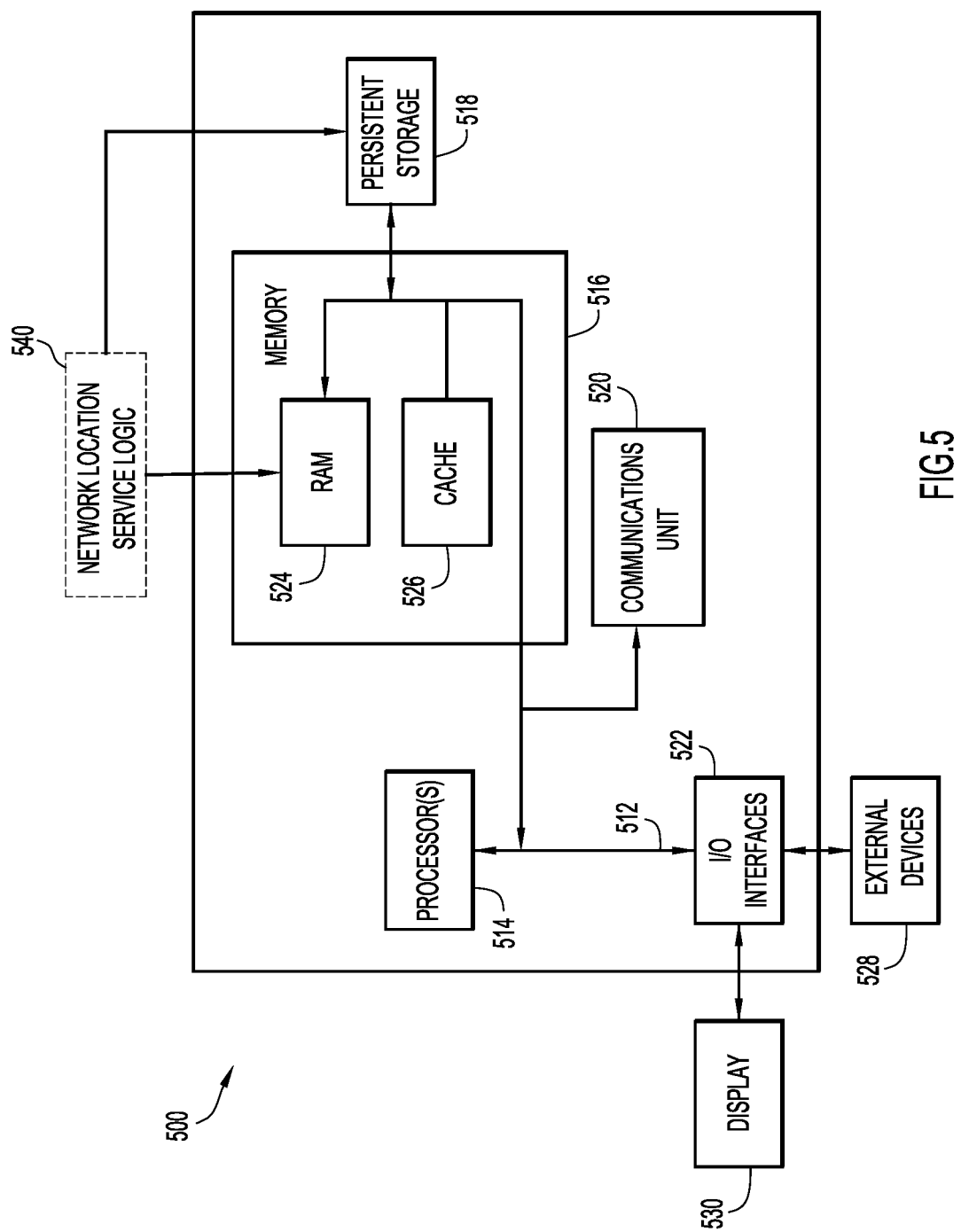
FIG. 5 is a hardware block diagram of a computing device that may perform functions for providing a network location service when a UE is not served by a 3GPP radio, in connection with the techniques depicted in FIGS. 1-3.

Referring to FIG. 5, FIG. 5 illustrates a hardware block diagram of a computing device 500 that may perform the functions of a mobility element (e.g., mobility element 112) for providing a network location service when a UE (e.g., V2X-UE 104.1) is not served by a 3GPP radio (e.g., not served by an E-UTRA or NR), referred to herein in connection with techniques depicted in FIGS. 1-3. It should be appreciated that FIG. 5 provides only an illustration of one embodiment and does not imply any limitations with regard to the environments in which different embodiments may be implemented. Many modifications to the depicted environment may be made.

As depicted, the computing device 500 includes a bus 512, which provides communications between computer processor(s) 514, memory 516, persistent storage 518, communications unit 520, and input/output (I/O) interface(s) 522. Bus 512 can be implemented with any architecture designed for passing data and/or control information between processors (such as microprocessors, communications and network processors, etc.), system memory, peripheral devices, and any other hardware components within a system. For example, bus 512 can be implemented with one or more buses.

Memory 516 and persistent storage 518 are computer readable storage media, which can be inclusive on non-transitory computer readable storage media. In the depicted embodiment, memory 516, which may also be referred to as memory element(s), includes random access memory (RAM) 524 and cache memory 526. In general, memory 516 can include any suitable volatile or non-volatile computer readable storage media. Instructions for network location service logic 540 may be stored in memory 516 and/or persistent storage 518 for execution by processor(s) 514. When the processor(s) 514 execute the network location service logic 540, the processor(s) 514 are caused to perform the operations described above in connection with FIGS. 1-3.

One or more programs and/or other logic may be stored in persistent storage 518 for execution by one or more of the respective computer processor(s) 514 via one or more memories of memory 516. The persistent storage 518 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 518 may also be removable. For example, a removable hard drive may be used for persistent storage 518. Other examples include optical and magnetic disks, thumb drives, and smart cards that are inserted into a drive for transfer onto another computer readable storage medium that is also part of persistent storage 518.

Communications unit 520, in these examples, provides for communications with other data processing systems or devices. In these examples, communications unit 520 includes one or more network interfaces and/or network interface cards. Communications unit 520 may provide communications through the use of either or both physical and wireless communications links.

I/O interface(s) 522 allows for input and output of data with other devices that may be connected to computing device 500. For example, I/O interface 522 may provide a connection to external devices 528 such as a keyboard, keypad, a touch screen, and/or some other suitable input device. External devices 528 can also include portable computer readable storage media such as database systems, thumb drives, portable optical or magnetic disks, and memory cards.

Software and data used to practice embodiments can be stored on such portable computer readable storage media and can be loaded onto persistent storage 518 via I/O interface(s) 522. I/O interface(s) 522 may also connect to a display 530. Display 530 provides a mechanism to display data to a user and may be, for example, a computer monitor.

Figure 6:
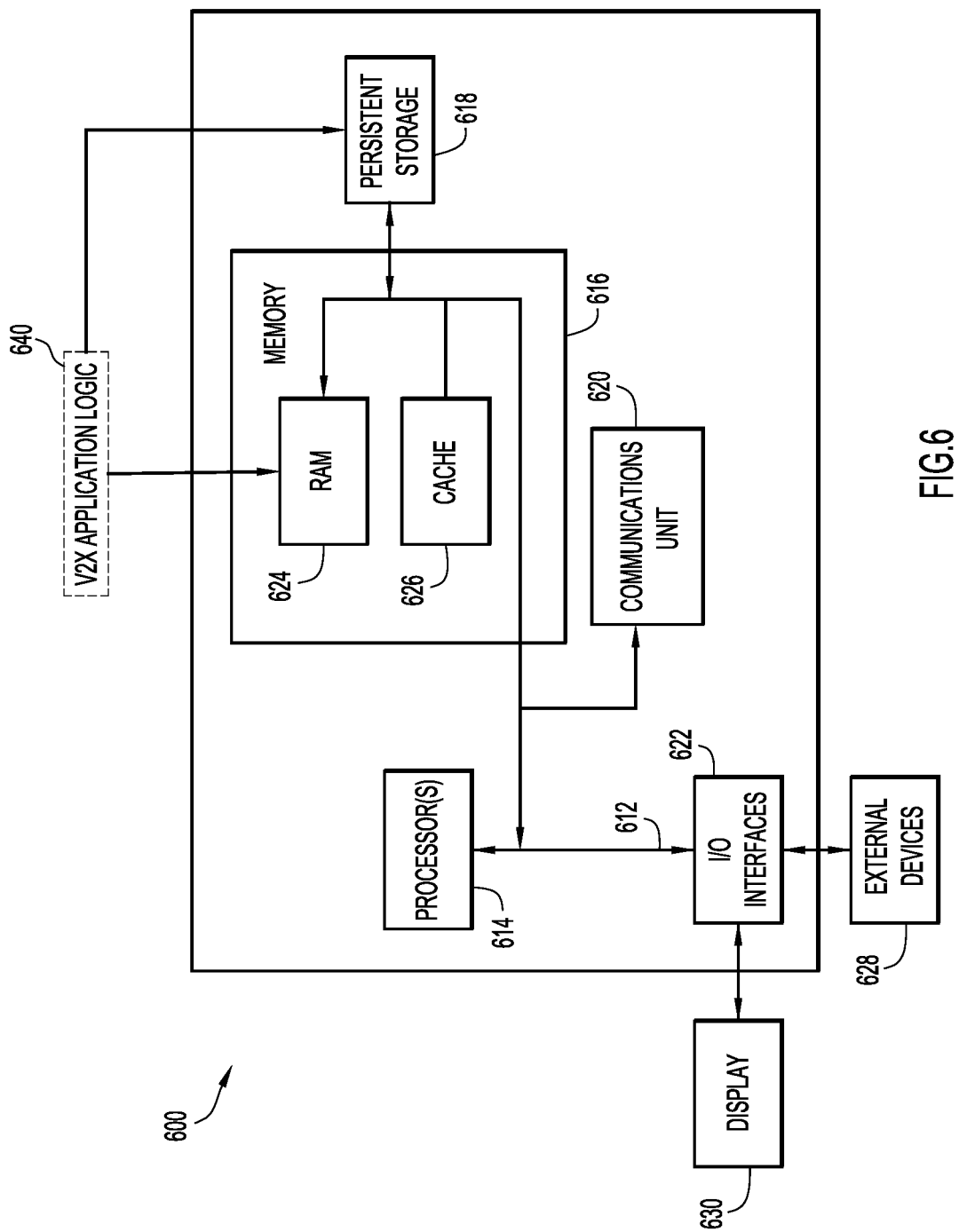
FIG. 6 is a hardware block diagram of a vehicle-to-everything (V2X) enabled UE (V2X-UE) that may perform functions for performing Autonomous PC5 communications when the V2X-UE is not served by a 3GPP radio, in connection with the techniques depicted in FIGS. 1-2 and 4.

Referring to FIG. 6, FIG. 6 illustrates a hardware block diagram of a V2X-UE 600 that may perform functions for performing Autonomous PC5 communications with the V2X-UE is not served by a 3GPP radio (e.g., not served by an E-UTRA or NR), referred to herein in connection with techniques depicted in FIGS. 1-2 and 4. It should be appreciated that FIG. 6 provides only an illustration of one embodiment and does not imply any limitations with regard to the environments in which different embodiments may be implemented. Many modifications to the depicted environment may be made.

As depicted, the V2X-UE 600 includes a bus 612, which provides communications between computer processor(s) 614, memory 616, persistent storage 618, communications unit 620, and input/output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media, which can be inclusive on non-transitory computer readable storage media. In the depicted embodiment, memory 616, which may also be referred to as memory element(s), includes random access memory (RAM) 624 and cache memory 626. In general, memory 616 can include any suitable volatile or non-volatile computer readable storage media. Instructions for V2X application logic 640 for one or more V2X applications provided for V2X-UE 600 may be stored in memory 616 and/or persistent storage 618 for execution by processor(s) 614. When the processor(s) 614 execute the V2X application logic 640, the processor(s) 614 are caused to perform the operations described above in connection with FIGS. 1-2 and 4.

One or more programs and/or other logic may be stored in persistent storage 618 for execution by one or more of the respective computer processor(s) 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes hardware and/or software for one or more transmitters, receivers, and antennas configured provided for V2X-UE 600. Communications unit 620 may provide communications through the use of either or both physical and wireless communications links.

I/O interface(s) 622 allows for input and output of data with other devices that may be connected to V2X-UE 600. For example, I/O interface 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor, a touch screen, or the like. In some implementations, display 630 may be integrated into V2X-UE 600.

In one form, a computer-implemented method is provided and may include obtaining, by a mobility element of a network, an attach request from a user equipment (UE), wherein the attach request indicates an attach type associated with a network location service; communicating, based on the attach type being associated with the network location service, an attach accept to the UE to trigger a location request for the UE, wherein the attach accept is communicated to the UE without the mobility element authenticating the UE; and communicating location information to the UE based on the location request.

In at least one implementation, communicating the location information to the UE enables communications between the UE and one or more other UE. The communications between the UE and the one or more other UE may utilize a cellular vehicle-to-everything (C-V2X) PC5 interface.

In at least one implementation, communicating an indication to the UE that the network supports a cellular vehicle-to-everything (C-V2X) network location service. The indication may be included within a first System Information Block (SIB) received by the UE.

In at least one implementation, the method may further include initializing, by the mobility element, a timer based on the attach type being associated with the network location service. Upon expiration of the timer, the method may further include discarding, by the mobility element, context information associated with the UE for the attach request obtained by the mobility element.

In at least one implementation, the UE is capable of 3rd Generation Partnership Project (3GPP) vehicle-to-everything (V2X) communications. In various implementations, the mobility element may be one or more of a mobility management element (MME) and an access and mobility management function (AMF).

The programs/operations described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer systems or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium, non-transitory computer readable storage medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

A network may be implemented by any number of any type of network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

A system or computing device may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). A database system may be included within or coupled to a server and/or client systems. The database systems and/or storage structures may be remote from or local to the computer or other processing systems, and may store any desired data (e.g., resource record data).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium, which can be inclusive of non-transitory computer readable storage medium, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flow chart illustrations and/or block diagrams of methods, apparatus (systems), and computer program products according to the embodiments. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart and block diagrams in the figures illustrate the architecture, functionality, and operation of possible implementations of systems, methods, and computer program products according to various embodiments. In this regard, each block in the flowchart or block diagrams may represent a module, logic, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flow chart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   obtaining, by a mobility element of a network, an attach request from a user equipment (UE), wherein the attach request indicates an attach type for a network location service that is to provide location information to the UE;
   communicating, based on the attach type being for the network location service, an attach accept to the UE to trigger a location request for the UE, wherein the attach accept is communicated to the UE without the mobility element authenticating the UE; and
   communicating location information to the UE based on the location request, wherein the location information is to enable autonomous PC5 communications between the UE and one or more other UE.

2. The method of claim 1, wherein the autonomous PC5 communications between the UE and the one or more other UE utilize a cellular vehicle-to-everything (C-V2X) PC5 interface.

3. The method of claim 1, further comprising:
   communicating an indication to the UE that the network supports the network location service.

4. The method of claim 3, wherein the indication is included within a first System Information Block (SIB) received by the UE.

5. The method of claim 1, further comprising:
   initializing, by the mobility element, a timer based on the attach type being for the network location service.

6. The method of claim 5, further comprising:
   upon expiration of the timer, discarding, by the mobility element, context information associated with the UE for the attach request obtained by the mobility element.

7. The method of claim 5, wherein the timer has a duration of between 60 seconds and 120 seconds.

8. The method of claim 1, wherein the UE is capable of 3rd Generation Partnership Project (3GPP) vehicle-to-everything (V2X) communications.

9. The method of claim 1, wherein the mobility element is one or more of a mobility management element (MME) and an access and mobility management function (AMF).

10. The method of claim 1, wherein the UE is not served by a Third Generation Partnership Project (3GPP) radio.

11. One or more non-transitory computer readable storage media encoded with instructions that, when executed by a processor, cause the processor to perform operations, comprising:
    obtaining, by a mobility element of a network, an attach request from a user equipment (UE), wherein the attach request indicates an attach type for a network location service that is to provide location information to the UE;
    communicating, based on the attach type being for the network location service, an attach accept to the UE to trigger a location request for the UE, wherein the attach accept is communicated to the UE without the mobility element authenticating the UE; and
    communicating location information to the UE based on the location request, wherein the location information is to enable autonomous PC5 communications between the UE and one or more other UE.

12. The media of claim 11, further comprising instructions that, when executed by the processor, cause the processor to perform further operations, comprising:
    communicating an indication to the UE that the network supports the network location service.

13. The media of claim 12, wherein the indication is included within a first System Information Block (SIB) received by the UE.

14. The media of claim 11, further comprising instructions that, when executed by the processor, cause the processor to perform further operations, comprising:
    initializing, by the mobility element, a timer based on the attach type being associated with the network location service.

15. The media of claim 14, further comprising instructions that, when executed by the processor, cause the processor to perform further operations, comprising:
    upon expiration of the timer, discarding, by the mobility element, context information associated with the UE for the attach request obtained by the mobility element.

16. A mobility element comprising:
    at least one memory element for storing data; and
    at least one processor for executing instructions associated with the data, wherein executing the instructions causes the mobility element to perform operations, comprising:
        obtaining, by the mobility element, an attach request from a user equipment (UE), wherein the attach request indicates an attach type for a network location service;
        communicating, based on the attach type being for the network location service, an attach accept to the UE to trigger a location request for the UE, wherein the attach accept is communicated to the UE without the mobility element authenticating the UE; and
        communicating location information to the UE based on the location request, wherein the location information is to enable autonomous PC5 communications between the UE and one or more other UE.

17. The mobility element of claim 16, wherein the mobility element is one or more of a mobility management element (MME) and an access and mobility management function (AMF).

18. The mobility element of claim 16, wherein executing the instructions causes the mobility element to perform further operations, comprising:
    initializing, by the mobility element, a timer based on the attach type being associated with the network location service.

19. The mobility element of claim 18, wherein executing the instructions causes the mobility element to perform further operations, comprising:
    upon expiration of the timer, discarding, by the mobility element, context information associated with the UE for the attach request obtained by the mobility element.

20. The mobility element of claim 18, wherein the timer has a duration of between 60 seconds and 120 seconds.

* * * * *